United States Patent Office 3,606,792
Patented Sept. 21, 1971

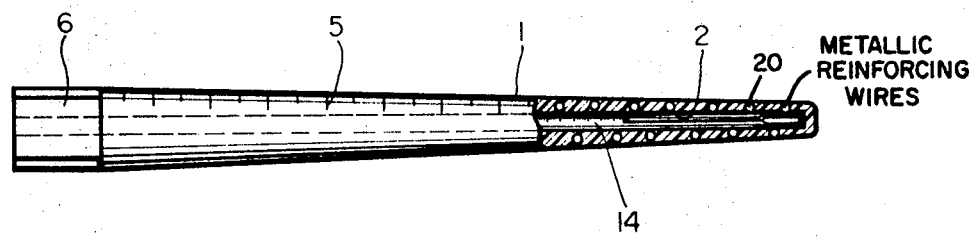
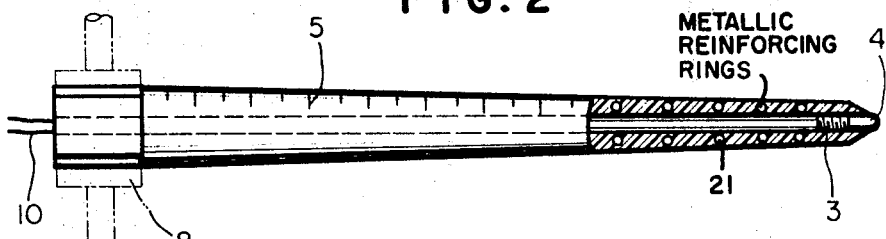
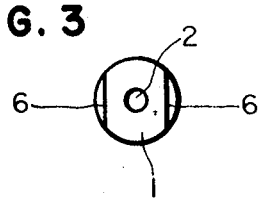
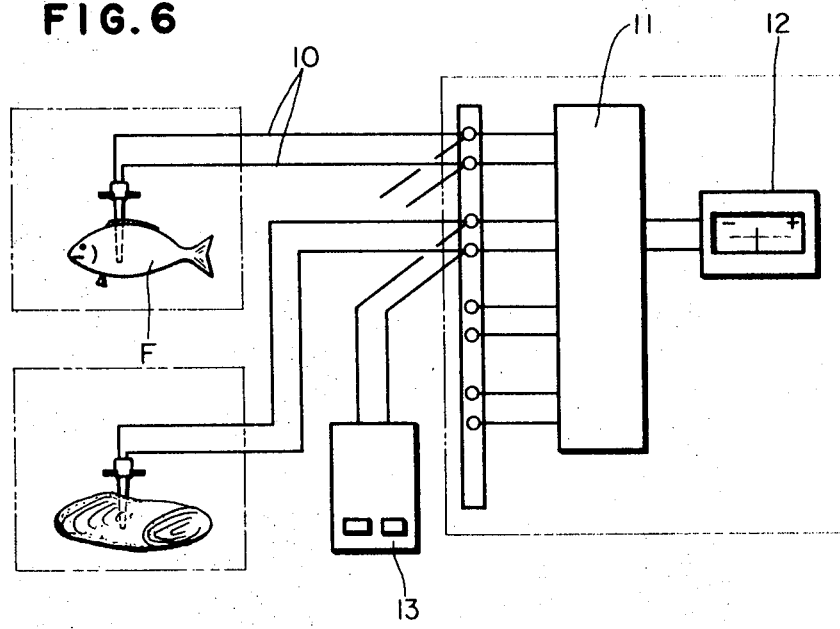

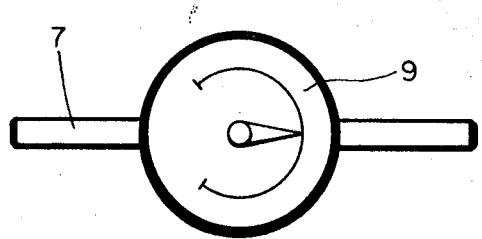
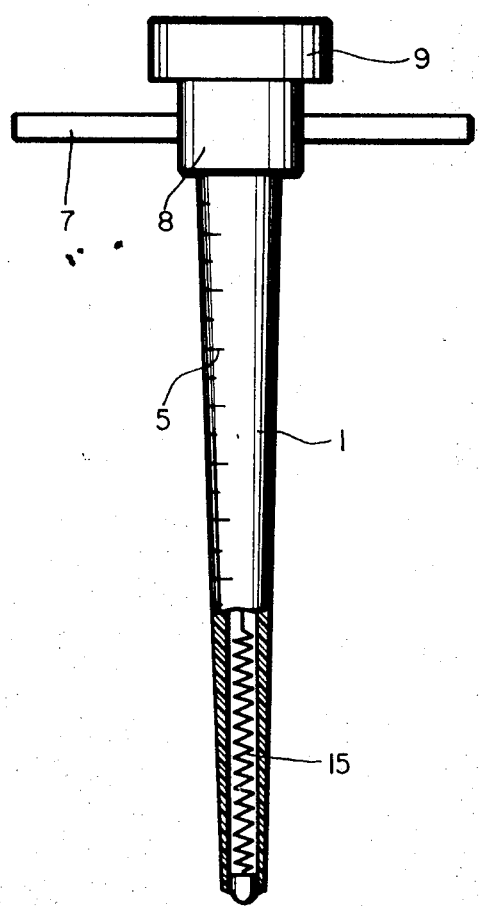

3,606,792
THERMOMETER FOR REFRIGERATOR
Tsuyoshi Yoshimoto, 727 Numame,
Isehara-machi, Kanagawa, Japan
Filed Feb. 18, 1969, Ser. No. 800,131
Int. Cl. G01k *1/08, 7/04, 6/04*
U.S. Cl. 73—341          9 Claims

ABSTRACT OF THE DISCLOSURE

A thermometer for monitoring the temperature of both the inside and the outside of commodities, such as meat, fish, etc., being refrigerated. A hollow probe or a protection tube is made of a fluoro resin such as polytetrafluoroethylene and inserted into the commodities being refrigerated. A thermometer element, such as a thermocouple, a temperature sensitive mercury thermometer element, or a temperature sensitive alcohol thermometer element, is placed in the probe. Temperature indication can be made either at the outlet of the probe or at a centralized control room by feeding signals carrying information related to the output from the thermometer element to the control room.

---

This invention relates to a thermometer, and more particularly to a thermometer for monitoring the temperature of commodities being refrigerated.

Recently, the cold-storage of foodstuff, such as meat, fish, vegetable, and fruits, is expanding at a rapid rate, so as to preserve the foodstuff for a long period of time and to facilitate their distribution in the market. Generally speaking, foodstuff has a very low heat conductivity, and accordingly, as the size of each piece of foodstuff being refrigerated becomes large, the time necessary for refrigerating the foodstuff piece uniformly to its core increases, and sometimes it takes a considerably long time. Furthermore, there is no suitable means available at present for measuring the temperature at the core or deep inside of the foodstuff piece being refrigerated with adequate accuracy, and it is very difficult to get an accurate picture of the temperature distribution in each foodstuff being refrigerated. Accordingly, the conventional practice in the cold storage is to refrigerate the foodstuff for an excessively long period by multiplying a considerably large safety factor to a known refrigerating time normally assumed based on experience. Such practice is not only inefficient, but also uneconomical.

To avoid such uneconomical excessive refrigeration, it has been proposed to measure the inside temperature of the foodstuff by using a thermometer consisting of a metallic protection tube and a temperature detecting element made of a thermocouple or a known mercury thermometer element. However, both the metallic probe proposed and the thermocouple to be used therewith have too large heat conductivity for the purpose of measuring the inside temperature of the foodstuff, and the temperature values obtained by using such metallic probe are affected by the outside temperature and include a large error. In addition, such thermometer element, thermocouple, and metallic protection tube are frequently tightly adhered to the foodstuff being refrigerated by freezing therewith. Thus, the previously proposed method of measuring the inside temperature of the foodstuff being refrigerated was not practicable.

Therefore, an object of the present invention is to provide an improved thermometer for a refrigerator, which is capable of monitoring the temperature of articles being refrigerated while obviating the aforesaid difficulties. The thermometer for refrigerator according to the present invention is characterized in that the measured value is not affected by the temperature, i.e. the inside or core temperature of the article being refrigerated can be measured accurately; the thermometer withstands considerably low refrigerating temperatures, and the thermometer can be easily removed from the article being refrigerated for reading the inside temperature thereof. The use of the thermometer according to the present invention is not restricted to foodstuffs, but it can be used with any article to which the thermometer can be inserted.

In order to fulfill the aforesaid object of the present invention, the protection tube is made of a rigid fluoro resin such as polytetrafluoroethylene and a temperature-detecting element is disposed in said protecting tube, such as a thermocouple, a bimetal, a temperature-sensitive resistor element, a thermistor, a mercury thermometer element, and the like, and the tip of such temperature-detecting element is either extended out of the tip of the protecting tube or disposed at the inside bottom wall of the protecting tube.

Other objects and a fuller understanding of the present invention may be had by referring to the following description, taken in conjunciton with the accompanying drawing, in which;

FIG. 1 is a schematic side view, partly in section, of a thermometer for refrigerator according to the present invention, having a fluoro resin protecting tube and a thermometer element disposed therein;

FIG. 2 is a view similar to FIG. 1, illustrating a different embodiment of the present invention having a thermocouple disposed in a protecting tube;

FIG. 3 is a top view of the thermometer of FIG. 2;

FIG. 4 is an elevation view, part in section, illustrating another embodiment of the invention having a bimetal element disposed in a protecting tube, in which a temperature indicator and a handle are mounted at the top of the tube;

FIG. 5 is a top view of the thermometer of FIG. 4; and

FIG. 6 is an electric circuit diagram of a refrigerator temperature monitoring system incorporating a plurality of thermometers according to the present invention.

Like parts and members are designated by like numerals and symbols throughout the drawings.

A fluoro resin such as polytetrafluoroethylene has a high thermal resistance in a temperature range of —180° C. to +260° C., and its coefficient of friction is the lowest among solid material. In fact, the coefficient of friction of polytetrafluoroethylene is similar to that between two blocks of ice. Polytetrafluoroethylene also has an extremely small tackiness, because its molecules have a very low adherence with molecules of other substances. Such properties of polytetrafluoroethylene are particularly suitable for a protecting tube of a thermometer element to be used in a refrigerator.

In the illustrated embodiment of the present invention, a tapered protecting tube 1 having a pointed tip is made of polyetetrafluoroethylene, and a temperature-detecting element is placed in the inside space 2 of the protecting tube 1. The temperature-detecting element usable in the thermometer of the present invention is a thermocouple 3, as shown in FIG. 2, a mercury thermometer element 14, as shown in FIG. 1, a bimetal 15, as shown in FIG. 4, a temperature-sensitive resistor, a thermistor, or the like. The embodiment depicted in FIG. 1 has a protecting tube 1 with its tip blocked, but it is also possible to prolong a sensing portion 4 of the temperature-detecting element out of the tip of the protecting tube 1, as shown in FIGS. 2 and 4.

If a mercury thermometer element 14 is used, as shown in FIG. 1, the entire protecting tube 1 is made of polytetrafluoroethylene, and the graduated portion of the thermometer element is extended out of the protecting tube so as to allow direct reading of the temperature by an operator. However, if such direct reading is not necessary, the protecting tube 1 need not be made solely of polytetrafluoroethylene, and in fact, it can be made of a metallic tube covered with polytetrafluoroethylene. It is also possible to reinforce mechanically a polytetrafluoroethylene tube by integrally molding metallic wires or metallic rings therein as shown at 20 and 21 in FIGS. 1 and 2 respectively.

In operation, the thermometer for a refrigerator, according to the present invention, is inserted into an article F (FIG. 6) being refrigerated, such as a piece of foodstuff such as meat and fish, so that the temperature sensing portion of the temperature-detecting element placed therein can be located at the desired portion of the article, for instance, at the core of the article. To facilitate the accurate positioning of the temperature sensing portion, graduations 5 are inscribed on the peripheral surface of the protecting tube 1.

With the aforesaid construction, the protecting tube 1 of the thermometer according to the present invention can be very easily inserted in and removed out of the article F being refrigerated, of which the temperature is measured by the thermometer. In the embodiment, as illustrated in FIG. 1 and FIG. 2, the top of the protecting tube 1 is chamfered and a pair of parallel flat portions 6, are formed, so that a handle 7 or other hand tool can engage the flat portion 6 with an adapter 8 inserted therebetween for facilitating the rotation and removal of the thermometer out of the article F.

With the sensing portion 4 extended out of the protecting tube 4, as shown in FIGS. 2 and 4, or the tip end of the protecting tube 1 kept in direct contact with the core portion of each article F being refrigerated, the temperature at the inside of the article F, such a piece of meat of fish, can be accurately measured. If a thermocouple 3 is used as the temperature-detecting element, as shown in FIG. 2, its output can be amplified by a suitable amplifier (not shown), and if the bimetal 15 is used as the temperature-detecting element, as shown in FIG. 4, its temperature-respensive deflection can be amplified by a suitable built-in gearing means (not shown), so that the accuracy of the measurement can be further improved.

In the particular embodiment, as shown in FIG. 4, an indicator 9 is mounted on the top of the protecting tube 1 for allowing the direct reading of the inside temperature of the article F by the rotation of a pointer along a scale. With the mercury thermometer element 14 disposed in the tapered protecting tube 1, as shown in FIG. 1, the direct temperature reading can be made by removing the prtoecting tube 1 out of the article F.

FIG. 6 shows an electric circuit diagram for measuring temperatures at different portions of a large refrigerating chamber, by using a plurality of the thermometers according to the present invention. In the figure, signals from each temperature-detecting element, such as the thermocouple 3 of FIG. 2 or a thermistor or the like, are brought into a junction box 11 at a centralized control board through lead wires 10. The thermometers can be located at different parts of the refrigerating chamber, such as the center of the chamber, in the proximity of the piping of refrigerant, in the proximity of entrance doors, and other suitable portions. The centralized control board can be located at the engine room of a ship, the main control room of a ship, the main control room of a land, warehouse, and the like. The signals from the junction box 11 are selectively fed to an indicator 12, such a bridge balance type indicator. It is also possible to effect automatic recording of the temperature distribution in the refrigerating chamber at certain time intervals by using a known automatic recording means in conjunction with thermometers according to the present invention located at various parts thereof. With such centralized control board of the refrigerating chamber temperature, cold storage of foodstuff and other articles can be easily and effectively carried out for an extended period of time. Furthermore, by adopting the aforesaid automatic recording of the temperature distribution of the refrigerating chamber, considerable saving in cost can be achieved by eliminating ship's crew or warehouse personnel required for regular checking of the temperature at various portions of the refrigerating chamber.

In FIG. 6, the numeral 13 represents an automatic temperature control means connected to the temperature measuring system. For instance, the temperature control means 13 has an alarm lamp or an alarm bell which is actuated at a certain predetermined temperature, such as —40° C., or the temperature control means 13 controls the flow of refrigerant at the particular portion of the refrigerating chamber in response to the temperature detected by the corresponding thermometer.

Although the present invention has been described with a certain degree of particularity, it is understood that the present disclosure has been made only by way of example and that numerous changes in the details of construction and the combination and arrangement of parts may be resorted to without departing from the spirit and the scope of the present invention as hereinafter claimed.

What is claimed is:

1. A thermometer for a refrigerator comprising a protecting tube made of polytetrafluoroethylene and reinforced by metallic elements integrally molded therewith, and a temperature-detecting element disposed within said protecting tube.

2. A thermometer according to claim 1, wherein in the temperature-detecting element is a thermocouple.

3. A thermometer according to claim 1, wherein the protecting tube is tapered so that the diameter thereof diminishes as the tube extends toward the tip thereof, whereby the protecting tube can be easily inserted in and removed from an article whose temperature is being measured.

4. A thermometer according to claim 1, wherein the temperature sensing portion of said temperature-detecting element is extended out of the tip of the protecting tube through a hole at the tip of the tube, whereby the temperature sensing portion can be brought into direct contact with the inside of the article whose temperature is measured.

5. A thermometer according to claim 1 wherein the protecting tube has a base end opposite the tip thereof, which base end has a flat edge engageable with a tool for turning the protecting tube.

6. A thermometer according to claim 1, wherein the protecting tube is provided with a temperature indicator connected to the temperature-detecting element and mounted at the end of the protecting tube opposite the tip thereof.

7. A thermometer according to claim 1 wherein said metallic elements are wires.

8. A thermometer according to claim 1 wherein said metallic elements are rings.

9. A temperature measuring system of a refrigerating chamber, comprising a plurality of thermometers each including a protecting tube of polytetrafluoroethylene resin containing metallic reinforcing elements integrally molded therewith and a temperature-detecting means disposed within the protecting tube, said thermometers being disposed at various parts in the refrigerating chamber, and a remote temperature indicator located outside of the refrigerating chamber and selectively connected to said thermometers whereby temperature at different parts of the refrigerating chamber can be remotely monitored by said remote temperature indicator.

(References on following page)

References Cited

UNITED STATES PATENTS

| | | | |
|---|---|---|---|
| 2,460,215 | 1/1949 | Chase | 73—352 |
| 2,631,220 | 3/1953 | Barsy | 73—352 |
| 2,780,097 | 2/1957 | McKinlay | 73—341 |
| 2,833,149 | 5/1958 | Aldridge | 73—352 |
| 2,967,428 | 1/1961 | Burgert | 73—352 |

FOREIGN PATENTS

| | | | |
|---|---|---|---|
| 2,447 | 12/1906 | Great Britain | 73—352 |
| 788,179 | 12/1957 | Great Britain | 73—352 |

LOUIS R. PRINCE, Primary Examiner

D. E. CORR, Assistant Examiner

U.S. Cl. X.R.

73—352